(12) United States Patent
Bell

(10) Patent No.: US 12,388,147 B2
(45) Date of Patent: Aug. 12, 2025

(54) LOCKING MECHANISM AND CONTAINER FOR DELIVERING ITEMS

(71) Applicant: United Parcel Service Of America, Inc., Atlanta, GA (US)

(72) Inventor: Julian Bell, Decatur, GA (US)

(73) Assignee: United Parcel Service Of America, Inc., Atlanta, GA (US)

(*) Notice: Subject to any disclaimer, the term of this patent is extended or adjusted under 35 U.S.C. 154(b) by 0 days.

(21) Appl. No.: 18/788,975

(22) Filed: Jul. 30, 2024

(65) Prior Publication Data

US 2024/0387930 A1 Nov. 21, 2024

Related U.S. Application Data

(63) Continuation of application No. 17/818,848, filed on Aug. 10, 2022, now Pat. No. 12,080,907.

(Continued)

(51) Int. Cl.
*H01M 50/269* (2021.01)
*B60H 1/00* (2006.01)
(Continued)

(52) U.S. Cl.
CPC ...... *H01M 50/269* (2021.01); *B60H 1/00264* (2013.01); *B60L 53/80* (2019.02);
(Continued)

(58) Field of Classification Search
CPC ............ H01M 50/269; H01M 50/204; H01M 50/249; H01M 50/264; H01M 50/296;
(Continued)

(56) References Cited

U.S. PATENT DOCUMENTS

| 720,395 A * | 2/1903 | Ash et al. ............... B65G 51/30 406/179 |
| 3,948,466 A * | 4/1976 | Rudder .................. B65G 51/26 406/73 |

(Continued)

FOREIGN PATENT DOCUMENTS

| CH | 508541 A | 6/1971 |
| CN | 102785937 A | 11/2012 |

(Continued)

OTHER PUBLICATIONS

Non-Final Office Action received for U.S. Appl. No. 17/711,739, mailed on Sep. 26, 2024, 8 pages.

(Continued)

*Primary Examiner* — Medhat Badawi
(74) *Attorney, Agent, or Firm* — Shook, Hardy & L.L.P.

(57) ABSTRACT

A canister is coupled to a delivery vehicle using a rail bracket. The canister comprises a securing channel having a first securing channel volume and a second securing channel volume. A width of the first securing channel volume is less than a width of the second securing channel volume. The rail bracket comprises a rotational shaft having a finger at one end. The rail bracket is inserted into the securing channel, and the rotational shaft is rotated. When rotated, the finger inhibits removal of the rail bracket from the securing channel, thereby providing a mechanism by which the canister can be releasably coupled to the rail bracket. The rail bracket may be provided on a delivery vehicle, such as an unmanned aerial vehicle (UAV) to transport the canister and contents within it.

20 Claims, 9 Drawing Sheets

Related U.S. Application Data

(60) Provisional application No. 63/237,392, filed on Aug. 26, 2021.

(51) Int. Cl.
| | | |
|---|---|---|
| *B60L 53/80* | (2019.01) | |
| *B64C 39/02* | (2023.01) | |
| *B64D 9/00* | (2006.01) | |
| *B64F 1/02* | (2006.01) | |
| *F25B 21/02* | (2006.01) | |
| *F25D 11/00* | (2006.01) | |
| *G05D 1/00* | (2006.01) | |
| *H01M 50/204* | (2021.01) | |
| *H01M 50/249* | (2021.01) | |
| *H01M 50/264* | (2021.01) | |
| *H01M 50/296* | (2021.01) | |
| *B64U 50/19* | (2023.01) | |
| *B64U 70/00* | (2023.01) | |
| *B64U 80/86* | (2023.01) | |
| *B64U 101/60* | (2023.01) | |

(52) U.S. Cl.
CPC .............. *B64C 39/024* (2013.01); *B64D 9/00* (2013.01); *B64F 1/02* (2013.01); *F25B 21/02* (2013.01); *F25D 11/003* (2013.01); *G05D 1/0202* (2013.01); *G05D 1/0246* (2013.01); *G05D 1/0684* (2013.01); *G05D 1/101* (2013.01); *H01M 50/204* (2021.01); *H01M 50/249* (2021.01); *H01M 50/264* (2021.01); *H01M 50/296* (2021.01); *B64U 50/19* (2023.01); *B64U 70/00* (2023.01); *B64U 80/86* (2023.01); *B64U 2101/60* (2023.01); *B64U 2201/10* (2023.01); *F25D 2201/14* (2013.01); *H01M 2220/20* (2013.01)

(58) Field of Classification Search
CPC ........... H01M 2220/20; B60H 1/00264; B60L 53/80; B64C 39/024; B64D 9/00; B64D 1/02; B64F 1/02; F25B 21/02; F25D 11/003; F25D 2201/14; G05D 1/0202; G05D 1/0246; G05D 1/0684; G05D 1/101; B64U 50/19; B64U 70/00; B64U 80/86; B64U 2101/60; B64U 2201/10; B64U 10/14; B64U 30/26
See application file for complete search history.

(56) References Cited

U.S. PATENT DOCUMENTS

| | | | | |
|---|---|---|---|---|
| 4,416,197 A | | 11/1983 | Kehl | |
| 5,508,908 A * | | 4/1996 | Kazama | H05K 7/20936 174/15.2 |
| 5,760,569 A * | | 6/1998 | Chase, Jr. | H01M 50/204 414/281 |
| 5,799,909 A * | | 9/1998 | Ziegler | B65F 1/1415 248/101 |
| 5,868,357 A * | | 2/1999 | Gabriel | B64D 1/22 294/907 |
| 6,179,357 B1 * | | 1/2001 | Gabriel | B66C 1/28 294/902 |
| 6,310,771 B1 * | | 10/2001 | Chien | H01L 23/467 174/16.3 |
| 6,554,151 B1 * | | 4/2003 | Brennan | B65F 1/06 220/495.04 |
| 6,674,052 B1 | | 1/2004 | Luo | |
| 7,509,995 B2 * | | 3/2009 | Bhatti | F28D 15/0233 165/80.4 |
| 7,631,444 B1 * | | 12/2009 | Hursen | E21B 7/18 37/322 |
| 7,635,065 B1 * | | 12/2009 | Pettinger | B65F 1/06 220/495.04 |
| 9,027,777 B1 * | | 5/2015 | Steidinger, III | B65F 1/068 220/908 |
| 9,033,281 B1 | | 5/2015 | Adams | |
| 9,280,038 B1 * | | 3/2016 | Pan | A45F 5/10 |
| 9,387,928 B1 * | | 7/2016 | Gentry | B64U 50/39 |
| 9,412,280 B1 * | | 8/2016 | Zwillinger | G08G 5/54 |
| 9,527,605 B1 * | | 12/2016 | Gentry | G05D 1/0094 |
| 9,650,133 B2 * | | 5/2017 | Fisher | B64C 29/02 |
| 9,676,481 B1 * | | 6/2017 | Buchmueller | G05D 1/0094 |
| 9,688,404 B1 * | | 6/2017 | Buchmueller | G05D 1/00 |
| 9,957,048 B2 * | | 5/2018 | Gil | E05F 15/77 |
| 9,969,494 B1 * | | 5/2018 | Buchmueller | G05D 1/0858 |
| 9,981,745 B2 | | 5/2018 | Gil | |
| 10,040,370 B2 * | | 8/2018 | Wei | B60L 50/66 |
| 10,071,804 B1 * | | 9/2018 | Buchmueller | B64U 50/19 |
| 10,246,187 B2 * | | 4/2019 | Cantrell | G05D 1/0027 |
| 10,274,952 B2 * | | 4/2019 | Cantrell | G05D 1/104 |
| 10,435,156 B2 * | | 10/2019 | Bellof | B64U 10/13 |
| 10,640,214 B2 * | | 5/2020 | Lopez | B64D 1/12 |
| 10,807,714 B2 * | | 10/2020 | Atchley | B64D 1/22 |
| 10,836,406 B2 * | | 11/2020 | Lum | B61B 13/08 |
| 10,899,449 B2 * | | 1/2021 | Luckay | B60R 11/00 |
| 11,187,200 B1 * | | 11/2021 | Kolbe | F02N 11/12 |
| 11,225,325 B1 * | | 1/2022 | Evans, II | B64D 1/12 |
| 11,345,051 B2 * | | 5/2022 | Zheng | B25J 15/10 |
| 11,453,498 B2 * | | 9/2022 | Martens | B64F 1/32 |
| 11,667,383 B2 | | 6/2023 | Evans, II | |
| 2005/0000967 A1 * | | 1/2005 | Najd | B65F 1/141 220/484 |
| 2005/0023284 A1 * | | 2/2005 | Heiberg | B65F 1/1646 220/827 |
| 2008/0083756 A1 * | | 4/2008 | Daniels | B65F 1/06 220/495.04 |
| 2014/0091172 A1 | | 4/2014 | Arlton et al. | |
| 2014/0180914 A1 * | | 6/2014 | Abhyanker | G06Q 10/0832 705/332 |
| 2015/0197389 A1 * | | 7/2015 | Bao | B65D 81/3816 220/592.27 |
| 2016/0068264 A1 * | | 3/2016 | Ganesh | G08G 5/55 701/4 |
| 2016/0140851 A1 * | | 5/2016 | Levy | G08G 5/34 701/410 |
| 2016/0257423 A1 * | | 9/2016 | Martin | B64U 50/34 |
| 2017/0015415 A1 * | | 1/2017 | Chan | G06Q 30/04 |
| 2017/0029101 A1 * | | 2/2017 | Weissenberg | B64U 30/299 |
| 2017/0038116 A1 * | | 2/2017 | Ros | F25B 21/04 |
| 2017/0217323 A1 * | | 8/2017 | Antonini | B60L 53/18 |
| 2017/0313421 A1 * | | 11/2017 | Gil | B64D 1/22 |
| 2017/0316375 A1 * | | 11/2017 | Gil | B65G 1/0435 |
| 2017/0349039 A1 * | | 12/2017 | Rayner | B62K 27/14 |
| 2017/0368959 A1 * | | 12/2017 | Hara | H01M 50/242 |
| 2018/0002015 A1 * | | 1/2018 | McCullough | B64D 1/08 |
| 2018/0062225 A1 * | | 3/2018 | You | H01M 10/6554 |
| 2018/0105063 A1 * | | 4/2018 | Wei | B64U 80/25 |
| 2018/0160525 A1 | | 6/2018 | Satake et al. | |
| 2018/0265222 A1 * | | 9/2018 | Takagi | B64U 80/25 |
| 2018/0312069 A1 * | | 11/2018 | McClymond | B64C 25/52 |
| 2018/0370618 A1 * | | 12/2018 | Harris | B64C 25/24 |
| 2019/0144007 A1 * | | 5/2019 | Lum | B64U 80/10 105/150 |
| 2019/0291865 A1 * | | 9/2019 | O'Donnell | B65D 81/3818 |
| 2020/0047353 A1 | | 2/2020 | Zheng | B64U 10/13 |
| 2021/0197982 A1 * | | 7/2021 | Sweeny | B64F 1/222 |
| 2021/0229903 A1 * | | 7/2021 | Goines, Jr. | B65F 1/068 |
| 2022/0035381 A1 * | | 2/2022 | Okuno | B64U 70/93 |
| 2022/0134899 A1 * | | 5/2022 | Eide | B64U 70/97 244/115 |
| 2022/0315209 A1 | | 10/2022 | Gil et al. | |
| 2022/0315222 A1 | | 10/2022 | Gil et al. | |
| 2022/0315246 A1 | | 10/2022 | Gil et al. | |
| 2022/0320669 A1 * | | 10/2022 | Gil | F15B 15/20 |
| 2023/0008634 A1 * | | 1/2023 | Kabakov | B64F 1/007 |
| 2023/0060684 A1 * | | 3/2023 | Bell | F25B 21/02 |

(56) References Cited

U.S. PATENT DOCUMENTS

| | | | |
|---|---|---|---|
| 2023/0063715 A1* | 3/2023 | Bell | G05D 1/249 |
| 2023/0131957 A1* | 4/2023 | Lowenberg | B64U 80/86 |
| | | | 244/137.1 |
| 2024/0387930 A1* | 11/2024 | Bell | B60H 1/00264 |

FOREIGN PATENT DOCUMENTS

| | | |
|---|---|---|
| CN | 110398983 A | 11/2019 |
| CN | 110963033 A | 4/2020 |
| CN | 112230672 A | 1/2021 |
| CN | 113183824 A | 7/2021 |
| DE | 102017209263 A1 | 12/2018 |
| EP | 1993940 A1 | 11/2008 |
| EP | 2644438 A2 | 10/2013 |
| EP | 2868577 A1 | 5/2015 |
| EP | 3177528 A1 | 6/2017 |
| FR | 2685547 A1 | 6/1993 |
| FR | 3075170 A1 | 6/2019 |
| JP | 53-045890 A | 4/1978 |
| JP | 01-176720 A | 7/1989 |
| JP | 2017-083063 A | 5/2017 |
| JP | 6176309 B2 | 8/2017 |
| KR | 10-1778883 B1 | 9/2017 |
| KR | 10-2019-0069968 A | 6/2019 |
| KR | 10-2021105 B1 | 9/2019 |
| KR | 10-2023-0164329 A | 12/2023 |
| WO | 95/21361 A1 | 8/1995 |
| WO | 2015/061008 A1 | 4/2015 |
| WO | 2015/158394 A1 | 10/2015 |
| WO | 2015/158934 A1 | 10/2015 |
| WO | 2016/019978 A1 | 2/2016 |
| WO | 2020/184166 A1 | 9/2020 |
| WO | 2020/235744 A1 | 11/2020 |
| WO | 2021/101735 A1 | 5/2021 |

OTHER PUBLICATIONS

Notice of Allowance received for U.S. Appl. No. 17/711,730, mailed on Oct. 1, 2024, 9 pages.

Final Office Action received for U.S. Appl. No. 17/887,812, mailed on Feb. 13, 2025, 20 pages.

Final Office Action received for U.S. Appl. No. 17/711,739, mailed on Apr. 16, 2025, 10 pages.

Non-Final Office Action received for U.S. Appl. No. 17/712,451, mailed on Mar. 10, 2025, 10 pages.

Office action received for Canadian Patent Application No. 3227086, mailed on Jun. 27, 2025, 5 pages.

* cited by examiner

LOCKING MECHANISM AND CONTAINER FOR DELIVERING ITEMS

CROSS-REFERENCE TO RELATED APPLICATIONS

This application is a continuation application U.S. patent application Ser. No. 17/818,848, entitled "Locking Mechanism and Container for Delivering Items," filed on Aug. 10, 2022; which claims priority to U.S. Provisional Application No. 63/237,392, entitled "Pneumatic Platform and Payload Containers for Unmanned Aerial Vehicles," filed on Aug. 26, 2021, each of which is hereby expressly incorporated by reference in its entirety.

BACKGROUND

Unmanned aerial vehicles (UAVs) are used to deliver packages. In doing so, a UAV retrieves a package and releases it at a delivery location.

SUMMARY

At a high level, aspects described herein relate to a canister and a rail bracket for releasably coupling the canister to a UAV, or other delivery vehicle.

An aspect of the canister comprises a first canister end that is opposite from a second canister end. The first canister end and the second canister end define a longitudinal direction. The canister comprises a wall that extends between the first canister end and the second canister end, and the wall defines an interior volume of the canister. Objects for delivery can be placed within the interior volume. The canister has a first securing channel with a first channel volume and a second channel volume. The first channel volume has a first width that is less than a second width of the second channel volume when the first and second widths are measured in the longitudinal direction. The second channel volume is more interior to a center aspect of the interior volume than the first channel volume.

An aspect of the rail bracket comprises a first bracket surface opposite a second bracket surface, such that the first bracket surface is exposed to the UAV. The rail bracket further comprises a first rotational shaft having a first shaft end and a second shaft end. The first rotational shaft extends through the first bracket surface and the second bracket surface, and comprises a first rotational axis. The first rotational shaft further comprises a first finger that extends radially from the first rotational shaft proximate to the second shaft end. The first rotational shaft extends a first radial distance from the first rotational axis, and the first radial distance is less than a second radial distance over which the first finger extends from the first rotational axis.

The rail bracket releasably couples the canister to the UAV. To do so, the rail bracket is inserted at least partially into the first securing channel, and the first rotational shaft is rotated, thereby transitioning the first finger from a first position to a second position, where the first position is substantially perpendicular to the longitudinal direction, and the second position is offset from the first position. In the first position, the canister is decoupled from the UAV, while in the second position, the canister is coupled to the UAV.

This summary is intended to introduce a selection of concepts in a simplified form that are further described below in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
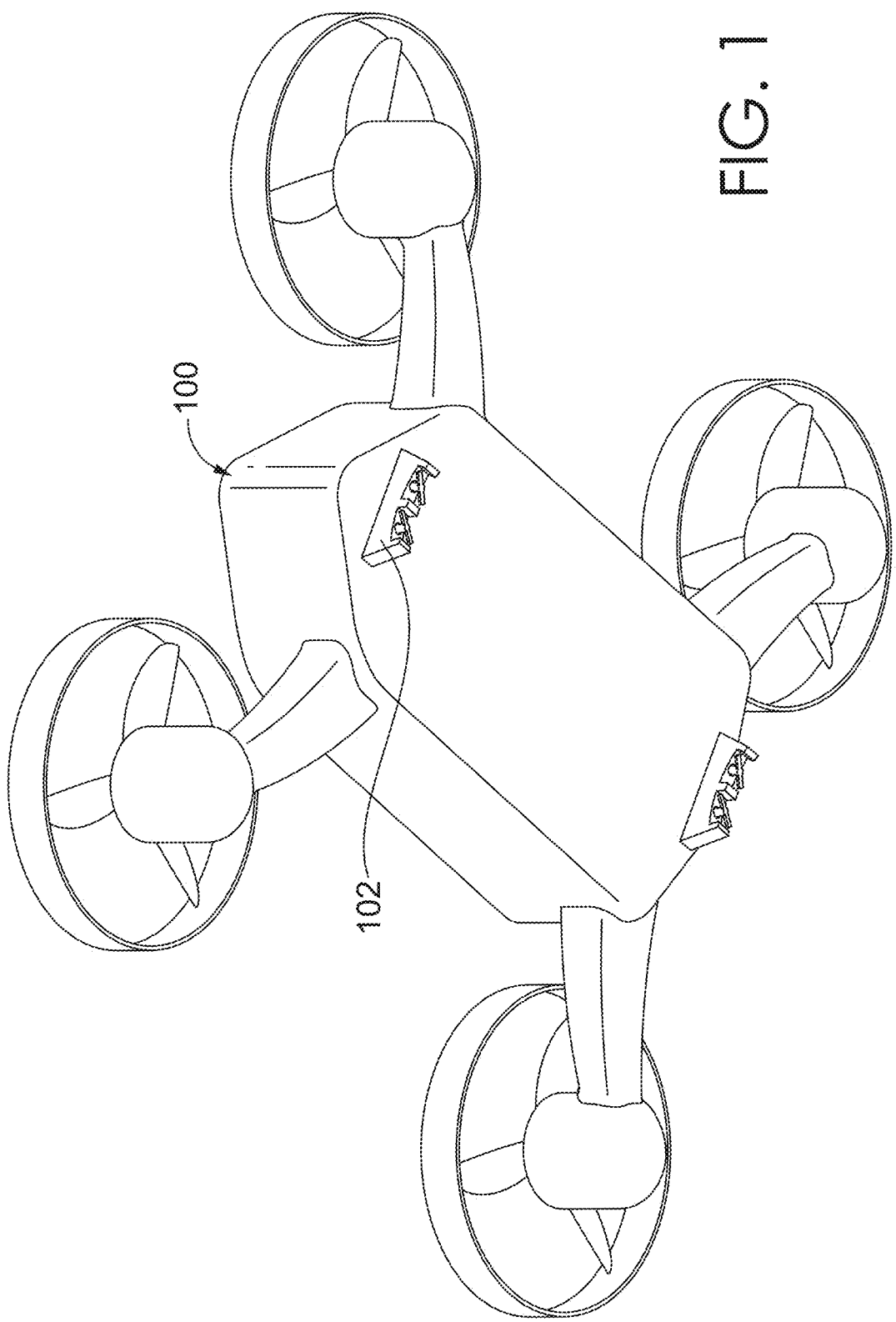
FIG. 1 is an example UAV comprising an example rail bracket, in accordance with an aspect described herein.

UAVs are useful in delivering items because there are fewer restrictions on travel paths, making last-mile delivery more efficient in some cases. Some UAVs house items within a fuselage, while some grasp items using external mechanisms. A goal of UAV delivery is for the UAV to retrieve the item at one location and to release the item at a second location.

The present disclosure provides a canister and a rail bracket that can be used in cooperation to deliver items. The canister includes an interior volume where items for delivery can be placed. The canister is releasably secured to the UAV by way of the rail bracket. Thus, an item can be loaded into the canister, and the canister secured to the UAV. The UAV navigates from one location to another location where it releases the canister, thereby delivering the object within it.

One example canister that can be used to accomplish this task comprises a first canister end that is opposite a second canister end. The canister includes a wall that at least partially defines the interior volume between the first canister end and the second canister end. The canister extends from the first canister end to the second canister end in a longitudinal direction.

To facilitate coupling to the UAV, the canister has one or more securing channels, including a first securing channel. The first securing channel has a first channel volume and a second channel volume. The first channel volume has a first width that is less than a second width of the second channel volume in the longitudinal direction. Further, the second channel volume is more interior to a center aspect of the interior volume than the first channel volume.

The rail bracket is used in cooperation with the canister. One example of a rail bracket comprises a first bracket surface opposite a second bracket surface. When in use with a delivery vehicle, such as a UAV, the first bracket surface is exposed to the delivery vehicle.

The rail bracket further comprises one or more rotational shafts, including a first rotational shaft. The first rotational shaft has a first shaft end opposite from and extending to a second shaft end. A first rotational axis extends through the first shaft end and the second shaft end. The first rotational shaft extends through the first bracket surface and the second bracket surface. Moreover, the first rotational shaft extends outward from the first rotational axis over a first radial distance.

The first rotational shaft has a first finger that is proximate the second shaft end. The first finger extends radially from the first rotational shaft over a second radial distance. The first radial distance is less than a second radial distance.

The rail bracket can be used to releasably couple the canister to the UAV such that the canister can be coupled and decoupled through rotation of the first rotational shaft. Here, the rail bracket is inserted at least partially into the first securing channel, and the first rotational shaft is rotated, such that it transitions the first finger from a first position to a second position. In the first position, the first finger is able to pass through the first channel volume and into the second channel volume. When rotated, the second position of the first finger is offset from the first position. The first finger rotates within the second channel volume. As an example, the first finger may be substantially perpendicular to the longitudinal direction when in the first position, and is then offset from the first position when rotated to the second position. In the second position, the first finger does no pass back through the first channel volume, thereby coupling, e.g., locking, the canister into place. Thus, in the first position, the canister is decoupled from the UAV, while in the second position, the canister is coupled to the UAV.

This arrangement is particularly beneficial in that the force applied to the securing bracket by the mass of the canister is not transferred to the rotational device that rotates the first rotational shaft. Rather, the force is transferred to other mechanical elements of the UAV or rail bracket. This allows smaller devices that apply relatively less force, such as small rotary solenoids, to be used, thereby reducing overall weight of the system and wear on the device that is used to release and secure the canister by rotating the first rotational shaft.

The aforementioned embodiments have been provided as examples of the technology that may be practiced from the present disclosure. They are intended to be examples and are provided to aid in understanding the technology and its benefits. Additional features and embodiments are further described with reference to the figures.

FIG. 1 illustrates example UAV 100 comprising example rail bracket 102. While UAV 100 is illustrated as a four rotor UAV, the present technology may be employed with various other UAV systems, and UAV 100 is intended to be illustrative in nature. Such UAV systems include, but are not limited to, vertical takeoff and landing systems, forward flight wing-based systems, and combinations thereof, along with any autonomous, semi-autonomous, or piloted system, and other like systems.

As illustrated, UAV 100 has coupled to it rail bracket 102. In general, UAV 100 may comprise one or more rail brackets, such as rail bracket 102. Any one or more rail brackets may be provided at any location, and in any arrangement, on a UAV to facilitate releasably coupling a canister to the UAV, as will be further described. In one particular position, such as that shown in FIG. 1, one or more rail brackets, such as rail bracket 102, are positioned on an underside of a fuselage. In an embodiment, rail bracket 102 is aligned with a center of gravity of UAV 100. As will be further described, alignment with the center of gravity may allow for additional power efficiencies when the UAV 100 is used to transport a canister using rail bracket 102.

Figure 2:
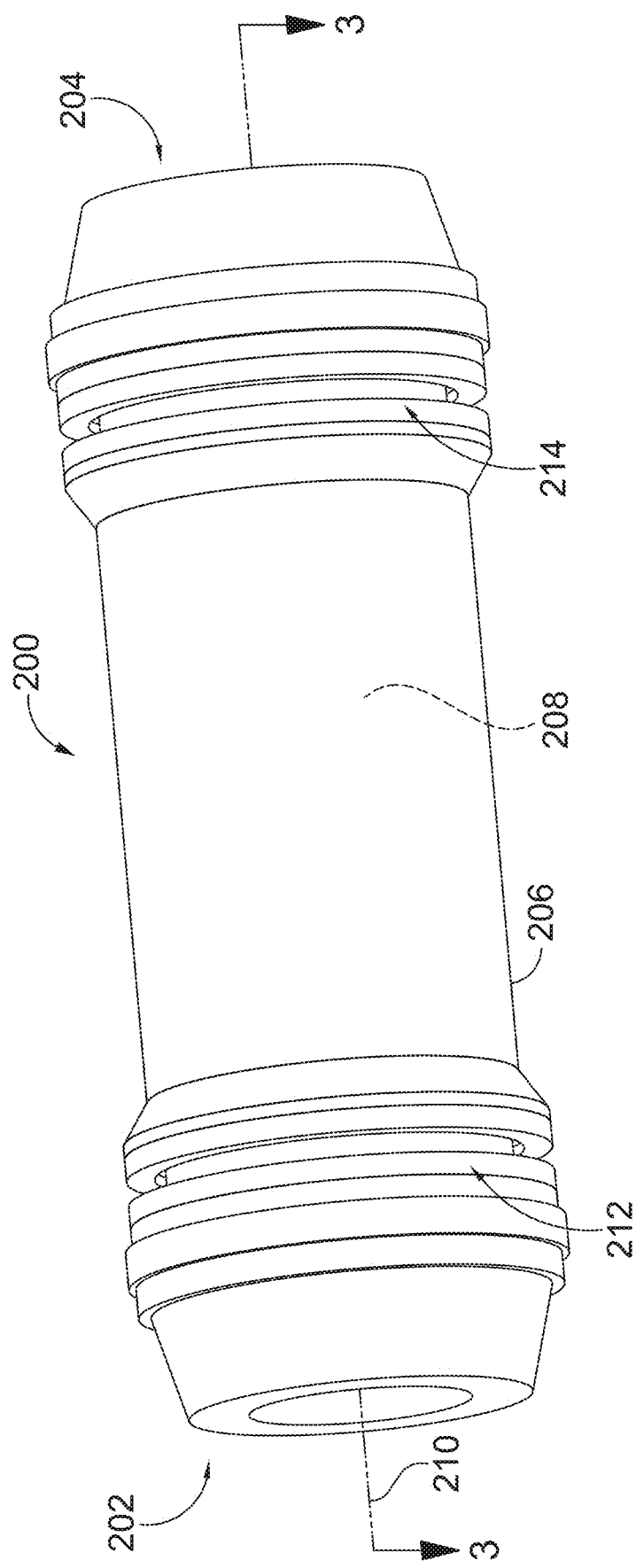
FIG. 2 is an example canister suitable for use with the rail bracket and UAV of FIG. 1, in accordance with an aspect described herein.

FIG. 2 illustrates an example canister 200 that is suitable for use with UAV 100 and rail bracket 102 of FIG. 1. In the example illustrated, canister 200 comprises first canister end 202 that is opposite from second canister end 204. Canister 200 extends from first canister end 202 to second canister end 204 along a longitudinal direction. Put another way, first canister end 202 is opposite second canister end 204 and defines the longitudinal direction therebetween.

Canister 200 may comprise any length. To provide some examples, canister 200 may have a length in the longitudinal direction that is from about 5 inches (in.) (12.7 centimeters (cm)) to about 15 in. (38.1 cm). Canister 200 length may be selected based on an item that will be carried within canister 200 or based on a size of a delivery vehicle carrying canister 200.

Canister 200 further comprises wall 206, which at least partially extends between first canister end 202 and second canister end 204. Wall 206 may be formed of any rigid material, such as a rigid polymer, e.g., PVC (polyvinyl chloride), HDPE (high-density polyethylene), PEEK (polyetheretherketone); a metal or metal alloy, e.g., aluminum, stainless steel; or another like material. Wall 206 may define at least a portion of interior volume 208. Interior volume 208 can correspond to an accessible chamber suitable for positioning objects therein, such as an item that is being delivered using canister 200.

Interior volume 208 comprises a center aspect 210. In the example illustrated, canister 200 is generally cylindrical, e.g., it comprises a polygonal or circular cross section at at least one location perpendicular to and along the longitudinal direction. Thus, center aspect 210 extends along the longitudinal direction at a midpoint of a cross section of the cylinder. In other arrangements, center aspect 210 may be determined based on the geometric shape of the canister and its corresponding interior volume.

Canister 200 comprises one or more securing channels. In general, a securing channel comprises a location or area at which a canister, such as canister 200, is coupled to another object. In aspects, a canister may be coupled at a securing channel to a delivery vehicle that moves the canister from one location to another. One specific delivery vehicle with which a canister, such as canister 200, can be used is a UAV. Other delivery vehicles include ground based vehicles, such cars, trucks, trailers, bicycles, and the like; conveyor systems, sorting systems, and the like; and aircraft. Such delivery systems may be manned, unmanned, autonomous, semi-autonomous, onboard operated, or remotely operated.

In the example illustrated by FIG. 2, canister 200 comprises first securing channel 212 and second securing channel 214. As noted, and in general, a canister may comprise any number of one or more securing channels. In the example illustrated, each of first securing channel 212 and second securing channel 214 extends at least partially around an outer aspect of canister 200. In embodiments, a securing channel, such as first securing channel 212 and second securing channel 214, extends entirely around an outer aspect of the canister.

As previously noted, canister 200 is substantially cylindrical, e.g., it has a polygonal or circular cross section at at least one location along the longitudinal direction. In a particular embodiment, the cross section is perpendicular to the longitudinal direction. As will be appreciated, all or a portion of canister 200 maybe substantially cylindrical. Thus, in a particular aspect, the polygonal or circular cross section is at a location corresponding to first securing channel 212 or second securing channel 214. In such cases, first securing channel 212 or second securing channel 214 may extend entirely or at least in part around the polygonal or circular cross section. In a particular aspect, first securing channel 212 or second securing channel 214 extends along a theoretical plane that is perpendicular to the longitudinal direction.

It will be understood, that, while the example provided herein is a substantially cylindrical canister, such mechanisms may be used in coordination with other objects of any size or shape. For instance, a first and second securing channel, arranged as previously described, may extend about any object being secured with a rail bracket, as will be further described. For instance, first and second securing channel may extend about a substantially flat surface, such as on a shipping container. In some cases, the orientation of these objects, when retrieved or released, is fixed, and thus, rotation about the first and second securing channel, as will be described, may not be required. In these cases, a rail bracket system of a delivery vehicle may interact with the first and second securing channels in manners similar to those provided herein, in order to release or retrieve the object for delivery.

As provided in the illustrated example of FIG. 2, first securing channel 212 is proximate first canister end 202. Thus, first securing channel 212 may be positioned at first canister end 202 or separated from first canister end 202 by a distance measured in the longitudinal direction. For instance, first securing channel 212 may be positioned at first canister end 202 or anywhere between first canister end 202 and a theoretical midline of canister 200 measured in the longitudinal direction. In example aspects, a portion of first securing channel 212 may be positioned at any a location from about 0.25 in. (0.64 cm) to about 7.5 in. (19.1 cm) away from first canister end 202, as measured in the longitudinal direction. In a particular embodiment not illustrated, first securing channel 212 is positioned at the theoretical midline, e.g., at a midpoint between first canister end 202 and second canister end 204.

In aspects that comprise second securing channel 214, such as that illustrated in FIG. 2, second securing channel 214 is proximate second canister end 204. Thus, second securing channel 214 may be positioned at second canister end 204 or separated from second canister end 204 by a distance measured in the longitudinal direction. For instance, second securing channel 214 may be positioned at second canister end 204 or anywhere between second canister end 204 and a theoretical midline of canister 200 measured in the longitudinal direction. In example aspects, a portion of second securing channel 214 may be positioned at any a location from about 0.25 in. (0.64 cm) to about 7.5 in (19.1 cm) away from second canister end 204, as measured in the longitudinal direction.

For those aspects that comprise at least two securing channels, securing channels may each be separated by a distance. As illustrated in FIG. 2, first securing channel 212 and second securing channel 214 are separated by a distance measured in the longitudinal direction. While securing channels may be separated by any distance, in an example aspect, first securing channel 212 and second securing channel 214 are positioned at any location such that first securing channel 212 is separated from second securing channel 214 anywhere from about 1 in. (2.5 cm) to about 10 in. (25.4 cm).

In some aspects, a distance from first securing channel 212 to first canister end 202 is less than a distance from first securing channel 212 to second canister end 204. In some aspects, the distance from first securing channel 212 to first canister end 202 is less than a distance from first securing channel 212 to second securing channel 214.

Figure 3A:
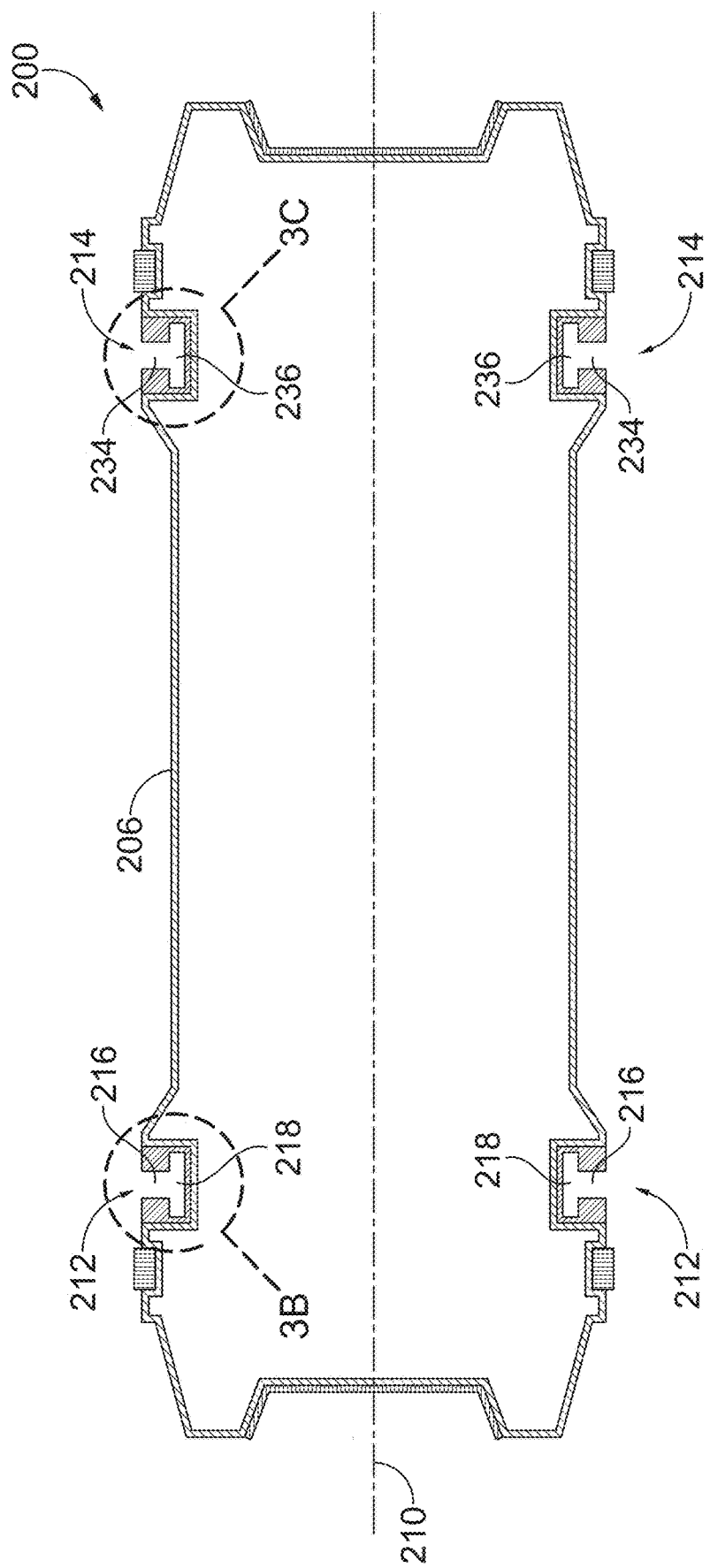
FIG. 3A is a longitudinal cross section of the canister of FIG. 2, in accordance with an aspect described herein.

FIG. 3A provides a cross sectional view of canister 200 of FIG. 2. The cross section is taken along the longitudinal direction at center aspect 210. FIG. 3A illustrates first securing channel 212. The cross sectional view illustrates first securing channel 212 and second securing channel 214 having extended around at least a portion of canister 200.

As illustrated in FIG. 3A, first securing channel 212 comprises first channel volume 216 and second channel volume 218. Further, as canister 200 is an example canister having two securing channels, canister 200 further comprises second securing channel 214, which comprises third channel volume 234 and fourth channel volume 236. Each of these will be more fully described with reference to FIG. 3B and FIG. 3C. As illustrated in FIG. 3A, second channel volume 218 of first securing channel 212 is more interior to center aspect 210 than first channel volume 216, while fourth channel volume 236 is more interior to center aspect 210 than third channel volume 234. Put another way, a distance from center aspect 210 to second channel volume 218 is less than a distance from center aspect 210 to first channel volume 216. Likewise, in this example, a distance from center aspect 210 to fourth channel volume 236 is less than a distance from center aspect 210 to third channel volume 234.

In the aspect illustrated first securing channel 212 and second securing channel 214 are each exterior to wall 206. In some aspects, a portion of first securing channel 212 or second securing channel 214 is exterior to wall 206. In a particular aspect of the technology, one or more securing channels are integrally formed by wall 206. That is, one or more features of a securing channel may be integrally formed from wall 206.

Figure 3B:
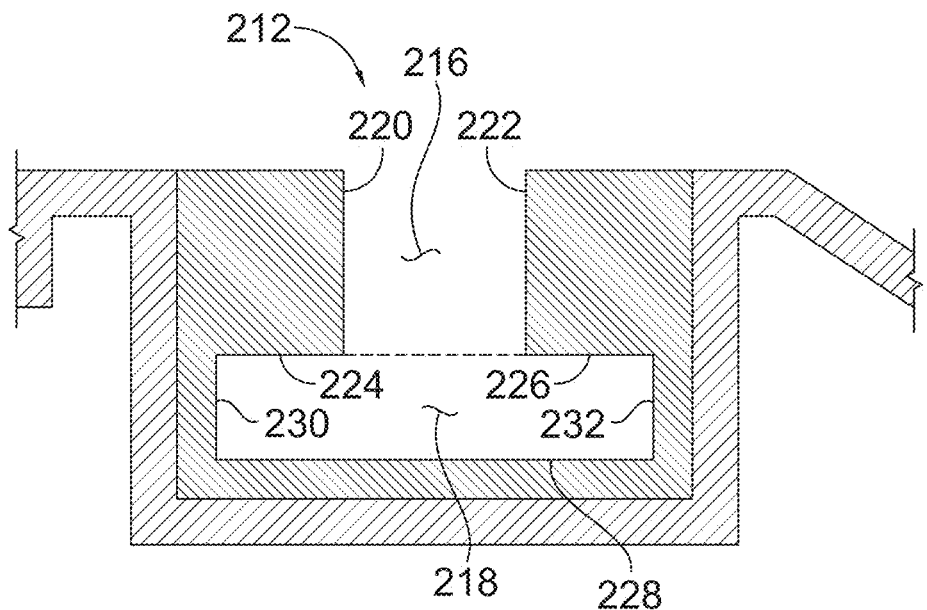
FIG. 3B is an expanded view of a portion of the longitudinal cross section of FIG. 3 that includes a first securing channel, in accordance with an aspect described herein.

To provide further illustration of this example, FIG. 3B illustrates a portion of canister 200 that comprises first securing channel 212. The figure illustrates a cross sectional view of first securing channel 212. Here, FIG. 3B provides further illustration of a cross section of the first channel volume 216 and second channel volume 218, which are show delineated by a theoretical dotted line.

First channel volume 216 may be defined by, at least in part, first channel surface 220 and second channel surface 222. First channel surface 220 and second channel surface 222 may extend in a direction perpendicular to the longitudinal direction. In the aspect illustrated, first channel surface 220 extends at least partially parallel with second channel surface 222 in the direction perpendicular to the longitudinal direction. First channel surface 220 is spaced apart from second channel surface 222, at least partially forming first channel volume 216. The distance corresponds to a first width of first channel volume 216 as measured in the longitudinal direction. To provide some examples, the first width may be any width from about 0.10 in (0.25 cm) to about 1.0 in. (2.54 cm).

Each of first channel surface 220 and second channel surface 222 extend in a direction away from center aspect 210, as illustrated in FIG. 3A. Thus, first channel volume 216 may also be defined at least partially by opposite terminal edges of each of first channel surface 220 and second channel surface 222 as each extends away from center aspect 210.

Second channel volume 218 may be defined, at least in part, by third channel surface 224 and fourth channel surface 226. In the example shown, third channel surface 224 is separated from fourth channel surface 226 by a distance that is about equal to the first width, e.g., the distance over which first channel surface 220 and second channel surface 222 are separated. Third channel surface 224 and fourth channel surface 226 are illustrated as extending in the longitudinal direction. In the illustrated aspect, second channel volume 218 is further at least partially defined by fifth channel surface 228, which extends in the longitudinal direction and is separated from each of third channel surface 224 and fourth channel surface 226 by a distance.

Second channel volume 218 may further be defined, at least in part, by sixth channel surface 230 and seventh channel surface 232. Sixth channel surface 230 and seventh channel surface 232, as illustrated in this example, are parallel and extend in the direction perpendicular to the longitudinal direction. Each of sixth channel surface 230 and seventh channel surface 232 extend in a direction away from center aspect 210, as illustrated in FIG. 3A. Second channel volume 218 may also be defined at least partially by opposite terminal edges of each of sixth channel surface 230 and seventh channel surface 232 as each extends away from center aspect 210. In this example a first terminal edge of each of sixth channel surface 230 and seventh channel surface 232 intersects fifth channel surface 228, while a second terminal edge of sixth channel surface 230 intersects third channel surface 224 and a second terminal edge of seventh channel surface 232 intersects fourth channel surface 226.

Sixth channel surface 230 and seventh channel surface 232 are spaced apart and separated by a distance. The distance over which sixth channel surface 230 and seventh channel surface 232 extends corresponds with a second width of second channel volume 218. To provide some examples, the second width may be greater than about 0.10 in (0.25 cm) to about 1.5 in. (3.8 cm).

To facilitate releasably coupling canister 200 to a delivery vehicle, e.g., using a rail bracket that will be further described, by way of first securing channel 212, the first width is less than the second width. Put another way, the distance from first channel surface 220 to second channel surface 222 is less than the distance from sixth channel surface 230 to seventh channel surface 232.

Figure 3C:
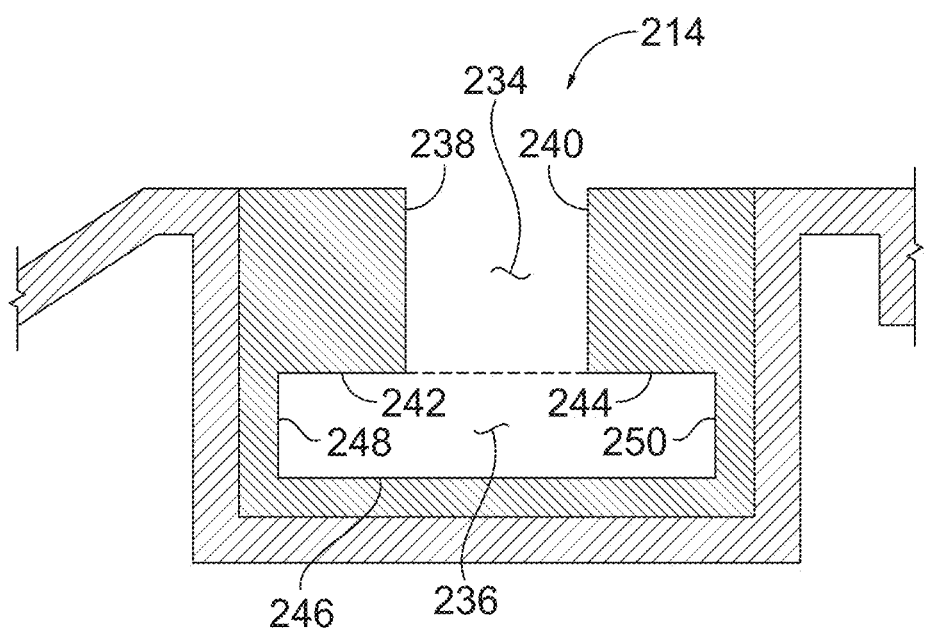
FIG. 3C is an expanded view of a portion of the longitudinal cross section of FIG. 3 that includes a second securing channel, in accordance with an aspect described herein.

FIG. 3C illustrates a portion of canister 200 that comprises second securing channel 214. The figure illustrates a cross sectional view of second securing channel 214. Here, FIG. 3C provides further illustration of a cross section of the third channel volume 234 and fourth channel volume 236, which are show delineated by a theoretical dotted line.

Third channel volume 234 may be defined by, at least in part, eighth channel surface 238 and ninth channel surface 240. Eighth channel surface 238 and ninth channel surface 240 may extend in a direction perpendicular to the longitudinal direction. In the aspect illustrated, eighth channel surface 238 extends at least partially parallel with ninth channel surface 240 in the direction perpendicular to the longitudinal direction. Eighth channel surface 238 is spaced apart from ninth channel surface 240, at least partially forming third channel volume 234. The distance corresponds to a third width of third channel volume 234 as measured in the longitudinal direction. To provide some examples, the third width may be any with from about 0.10 in (0.25 cm) to about 1.0 in. (2.54 cm). In a particular aspect, the third width is the same as the first width, thereby allowing canister 200 to be coupled in any orientation.

Each of eighth channel surface 238 and ninth channel surface 240 extend in a direction away from center aspect 210, as illustrated in FIG. 3A. Thus, third channel volume 234 may also be defined at least partially by opposite terminal edges of each of eighth channel surface 238 and ninth channel surface 240 as each extends away from center aspect 210.

Fourth channel volume 236 may be defined, at least in part by tenth channel surface 242 and eleventh channel surface 244. In the example shown, tenth channel surface 242 is separated from eleventh channel surface 244 by a distance that is about equal to the third width, e.g., the distance over which eighth channel surface 238 and ninth channel surface 240 are separated. Tenth channel surface 242 and eleventh channel surface 244 are illustrated as extending in the longitudinal direction. In the illustrated aspect, fourth channel volume 236 is further at least partially defined by twelfth channel surface 246, which extends in the longitudinal direction and is separated from each of tenth channel surface 242 and eleventh channel surface 244 by a distance.

Fourth channel volume 236 may further be defined, at least in part, by thirteenth channel surface 248 and fourteenth channel surface 250. Thirteenth channel surface 248 and fourteenth channel surface 250, as illustrated in this example, are parallel and extend in the direction perpendicular to the longitudinal direction. Each of thirteenth channel surface 248 and fourteenth channel surface 250 extend in a direction away from center aspect 210, as illustrated in FIG. 3A. Fourth channel volume 236 may also be defined at least partially by opposite terminal edges of each of thirteenth channel surface 248 and fourteenth channel surface 250 as each extends away from center aspect 210. In this example a first terminal edge of each of thirteenth channel surface 248 and fourteenth channel surface 250 intersects twelfth channel surface 246, while a second terminal edge of thirteenth channel surface 248 intersects tenth channel surface 242 and a second terminal edge of fourteenth channel surface 250 intersects eleventh channel surface 244.

Thirteenth channel surface 248 and fourteenth channel surface 250 are spaced apart and separated by a distance. The distance over which thirteenth channel surface 248 and fourteenth channel surface 250 extends corresponds with a fourth width of fourth channel volume 236. To provide some examples, the fourth width may be greater than about 0.10 in. (0.25 cm) to about 1.5 in. (3.8 cm). In a particular aspect, the second width is the same as the fourth width, thereby allowing canister 200 to be coupled in any orientation.

To facilitate releasably coupling canister 200 to an object by way of second securing channel 214, the third width can be less than the fourth width. Put another way, the distance from eighth channel surface 238 to ninth channel surface 240 is less than the distance from thirteenth channel surface 248 to fourteenth channel surface 250.

Each of the channel surfaces described with reference to FIG. 3B and FIG. 3C may extend entirely or at least partially around canister 200. In an aspect, such as the one illustrated by FIGS. 3A-3C, first securing channel 212 extends parallel with at least a portion of second securing channel 214.

Figure 4:
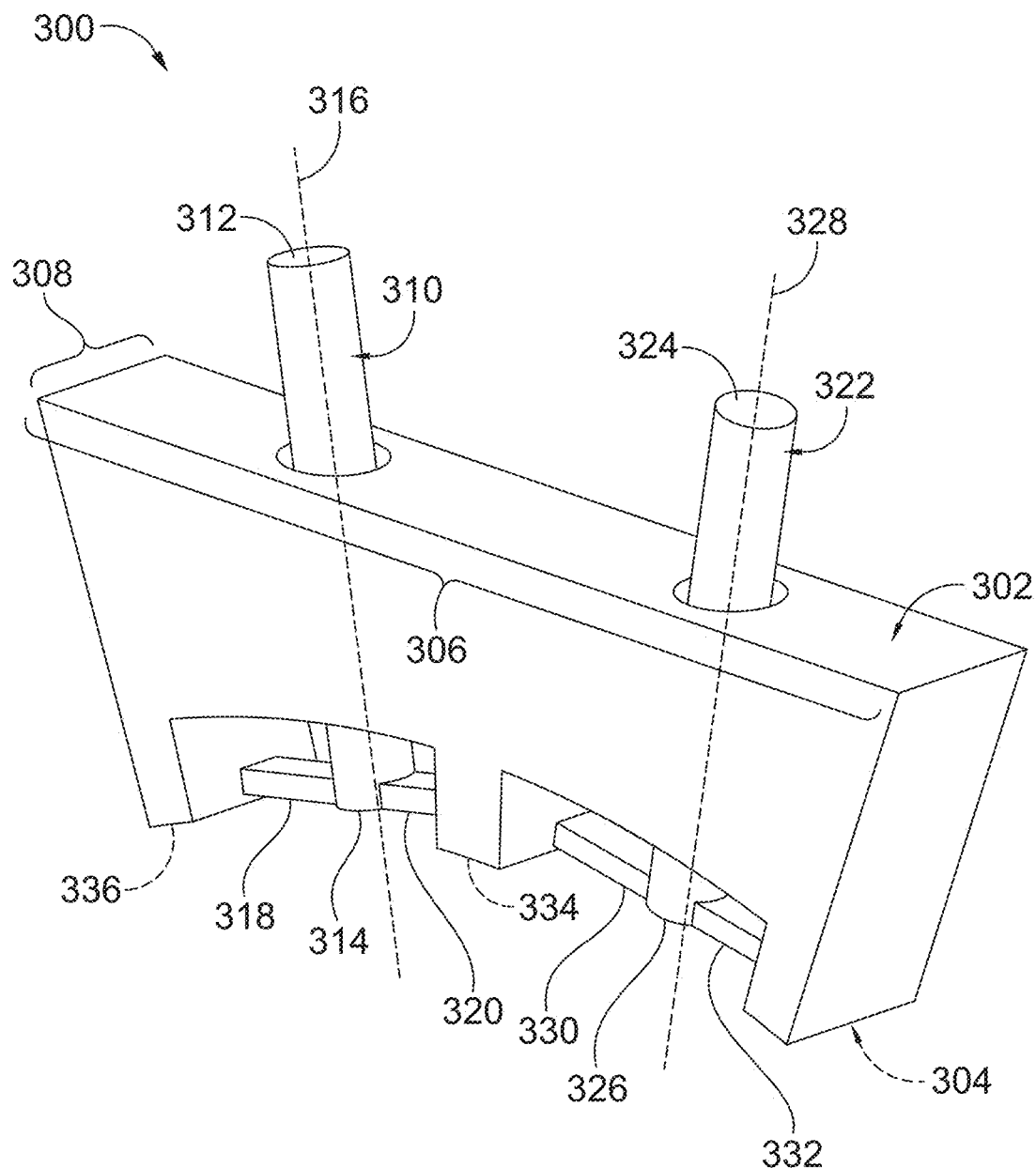
FIG. 4 is an example rail bracket suitable for use with the UAV of FIG. 1 and the canister of FIG. 2, in accordance with an aspect described herein.

Turning now to FIG. 4, an example rail bracket 300 is provided. Rail bracket 300 is one example that is suitable for use in releasably coupling canister 200 via first securing channel 212 and second securing channel 214.

In this example, rail bracket 300 comprises first bracket surface 302 and second bracket surface 304. First bracket surface 302 is opposite and spaced apart from second bracket surface 304. Rail bracket 300 extends between first bracket surface 302 and second bracket surface 304. Rail bracket 300 comprises rail bracket length 306 in a first direction and rail bracket width 308 in second direction. Rail bracket length 306 and rail bracket width 308 may be measured anywhere at or between first bracket surface 302 and second bracket surface 304. Rail bracket length 306 may be greater than rail bracket width 308. In an aspect, rail bracket 300 tapers inward from first bracket surface 302 to second bracket surface 304.

In general, rail brackets may comprise one or more rotational shafts. In the example provided by FIG. 4, rail bracket 300 comprises at least first rotational shaft 310. First rotational shaft 310 comprises first shaft end 312 that is opposite from second shaft end 314. First rotational shaft 310 extends longitudinally between first shaft end 312 and second shaft end 314 and has a first longitudinal length measured between first shaft end 312 and second shaft end 314. The longitudinal length may be greater than a distance measured between first bracket surface 302 and second bracket surface 304. As such, first rotational shaft 310 can extend from first shaft end 312 through first bracket surface 302 and second bracket surface 304 to second shaft end 314.

First rotational shaft 310 comprises first rotational axis 316. First rotational axis 316 is represented by way of a theoretical dashed line. First rotational axis 316 may extend through first rotational shaft 310 along the first longitudinal length, and theoretically extend through first shaft end 312 and second shaft end 314. As such, at least a portion of first rotational shaft 310 extends a first radial distance outward from first rotational axis 316. First rotational shaft 310 may rotate about, at least partially or fully, first rotational axis 316. In a particular aspect, first rotational shaft 310 rotates about first rotational axis 316 by at least 90° (degrees). While first rotational shaft 310 is illustrated as a cylindrical object, nothing is intended to limit first rotational shaft 310 to only this example, and other geometric configurations are contemplated as also suitable.

Rail bracket 300 may comprise one or more fingers that extend from first rotational shaft 310 beyond the first radial distance. In the aspect illustrated by FIG. 4, first rotational shaft 310 comprises first finger 318 proximate second shaft end 314. That is, first finger 318 may be positioned at second shaft end 314 or at a location along first rotational shaft 310, such that the location at which first finger 318 is positioned is closer to second shaft end 314 than first shaft end 312. First finger 318 may be a separate component or integrally formed as part of first rotational shaft 310. In general, first finger 318 extends away from first rotational axis 316 over a second radial distance, and the second radial distance is greater than the first radial distance. In the example provided, first finger 318 comprises a length measured in a direction extending away from first rotational axis 316 that is greater than a width of first finger 318.

As noted, first rotational shaft 310 rotates about first rotational axis 316. In this way, first finger 318 can be transitioned between a first position and a second position. In the example illustrated, in the first position, first finger 318 extends away from first rotational axis 316 along the first direction defined by rail bracket length 306. When first rotational shaft 310 rotates, first finger 318 is transitioned to a second position that is offset from the first position based on the degree of rotation. In a particular case, first rotational shaft 310 rotates about 90°, thereby causing the second position to be offset from the first position by the same about 90°.

In the particular example provided by FIG. 4, rail bracket 300 comprises second finger 320 that extends from first rotational shaft 310 in a direction opposite that of first finger 318. Second finger 320 may be a separate component or be an integral component of first rotational shaft 310 or first finger 318. As illustrated, second finger 320 is proximate second shaft end 314. That is, second finger 320 may be positioned at second shaft end 314 or at a location along first rotational shaft 310, such that the location at which second finger 320 is positioned is closer to second shaft end 314 than first shaft end 312. Second finger 320 extends away from first rotational axis 316 a third radial distance that is greater than the first radial distance. In the example provided, second finger 320 comprises a length measured in a direction extending away from first rotational axis 316 that is greater than a width of second finger 320. When first rotational shaft 310 rotates, second finger 320 may similarly transition from a first position to a second position that is offset from the first position based on the degree of rotation. In a particular case, first rotational shaft 310 rotates about 90°, thereby causing the second position to be offset from the first position by the same about 90°. In the first position, second finger 320 may extend away from first rotational axis 316 in a direction that corresponds to the first direction defined by rail bracket length 306.

As described, rail bracket 300 may comprises one or more rotational shafts, including second rotational shaft 322. Second rotational shaft 322 comprises third shaft end 324 that is opposite from fourth shaft end 326. Second rotational shaft 322 extends longitudinally between third shaft end 324 and fourth shaft end 326 and has a second longitudinal length measured between third shaft end 324 and fourth shaft end 326. The longitudinal length may be greater than a distance measured between first bracket surface 302 and second bracket surface 304. As such, second rotational shaft 322 can extend from third shaft end 324 through first bracket surface 302 and second bracket surface 304 to fourth shaft end 326.

Second rotational shaft 322 comprises second rotational axis 328. Second rotational axis 328 is represented by way of a theoretical dashed line. Second rotational axis 328 may extend through second rotational shaft 322 along the second longitudinal length, and theoretically extend through third shaft end 324 and fourth shaft end 326. As such, at least a portion of second rotational shaft 322 extends a fourth radial distance outward from second rotational axis 328. Second rotational shaft 322 may rotate about, at least partially or fully, second rotational axis 328. In a particular aspect, second rotational shaft 322 rotates about second rotational axis 328 by at least 90°. While second rotational shaft 322 is illustrated as a cylindrical object, nothing is intended to limit second rotational shaft 322 to only this example, and other geometric configurations are contemplated as also suitable.

Rail bracket 300 may comprise one or more fingers that extend from second rotational shaft 322 beyond the fourth radial distance. In the aspect illustrated by FIG. 4, second rotational shaft 322 comprises third finger 330 proximate fourth shaft end 326. That is, third finger 330 may be positioned at fourth shaft end 326 or at a location along second rotational shaft 322, such that the location at which third finger 330 is positioned is closer to fourth shaft end 326 than third shaft end 324. Third finger 330 may be a separate component or integrally formed as part of second rotational shaft 322. In general, third finger 330 extends away from second rotational axis 328 over a fifth radial distance, and the fifth radial distance is greater than the fourth radial distance. In the example provided, third finger 330 comprises a length measured in a direction extending away from second rotational axis 328 that is greater than a width of third finger 330.

As noted, second rotational shaft 322 rotates about second rotational axis 328. In this way, third finger 330 can be transitioned between a third position and a fourth position. In the example illustrated, in the third position, third finger 330 extends away from second rotational shaft 322 along the first direction defined by rail bracket length 306. When second rotational shaft 322 rotates, third finger 330 is transitioned to a fourth position that is offset from the third position based on the degree of rotation. In a particular case, second rotational shaft 322 rotates about 90°, thereby causing the fourth position to be offset from the third position by the same about 90°.

In the particular example provided by FIG. 4, rail bracket 300 comprises fourth finger 332 that extends from second rotational shaft 322 in a direction opposite that of third finger 330. Fourth shaft end 326 may be a separate component or be an integral component of second rotational shaft 322 or third finger 330. As illustrated, fourth finger 332 is proximate fourth shaft end 326. That is, fourth finger 332 may be positioned at fourth shaft end 326 or at a location along second rotational shaft 322, such that the location at which fourth finger 332 is positioned is closer to fourth shaft end 326 than third shaft end 324. Fourth finger 332 extends away from second rotational axis 328 a sixth radial distance that is greater than the fourth radial distance. In the example provided, fourth finger 332 comprises a length measured in a direction extending away from second rotational axis 328 that is greater than a width of fourth finger 332. When second rotational shaft 322 rotates, fourth finger 332 may similarly transition from a third position to a fourth position that is offset from the third position based on the degree of rotation. In a particular case, second rotational shaft 322 rotates about 90°, thereby causing the fourth position to be offset from the third position by the same about 90°. In the third position, fourth finger 332 may extend away from second rotational axis 328 in a direction that corresponds to the first direction defined by rail bracket length 306.

In some aspects, a second bracket surface is shaped to correspond with a container with which the rail bracket will releasably couple. That is, one portion of the second bracket surface may have a distance from the first bracket surface that is different from a distance between a second portion of the second bracket surface and the first bracket surface. Looking at FIG. 4, second bracket surface 304 comprises an arc that is used to enhance coupling to a canister, such as canister 200 of FIG. 2. With reference still to FIG. 4, first portion 334 of second bracket surface 304 has a distance from first bracket surface 302 that is less than a distance measured from second portion 336 of second bracket surface 304 to first bracket surface 302. In this case, second bracket surface 304 curves outward and away from first bracket surface 302 in an outward direction from a center aspect of second bracket surface 304.

Moreover, in some aspects that comprises more than one rotational shaft, the rotational shafts may be angled based on an object with which the rail bracket will releasably couple. As noted, one suitable use of rail bracket 300 is to releasably couple a substantially cylindrical canister. As such, first rotational shaft 310 and second rotational shaft 322 are angled such that respective second shaft end 314 and fourth shaft end 326 engage a securing channel of the canister. In this particular example, first rotational axis 316 and second rotational axis 328 theoretically extend beyond second shaft end 314 and fourth shaft end 326, respectively, and are convergent in a direction extending outward and away from second bracket surface 304. It will be understood that rotational shafts in other aspects may have the same angle or be offset by any degree to correspond to the container size or shape.

In an aspect of the technology, the one or more rotational shafts are biased in a direction toward a first shaft end. Such bias may be provided by a spring or other mechanical feature applying a force to the one or more rotational shafts in the direction toward the first shaft end. Using the example provided by FIG. 4, first rotational shaft 310 or second rotational shaft 322 may be biased in a direction from second shaft end 314 toward first shaft end 312 and fourth shaft end 326 toward third shaft end 324, respectively. Such features may provide additional locking benefits that will be further described.

As will be further discussed, rail bracket 300 may be employed with a delivery vehicle, such as a UAV, to retrieve an object for delivery, such as a canister corresponding to those described. FIG. 1 illustrates one such example. When employed, first bracket surface 302 can be exposed to the delivery vehicle, such as the UAV. That is, first bracket surface 302 is closer to the delivery vehicle relative to second bracket surface 304 when rail bracket 300 is secured to the delivery vehicle, either directly or indirectly.

Various devices may be employed to rotate rotational shafts, such as first rotational shaft 310 and second rotational shaft 322. These include electric motors, actuators, servos, solenoids, and the like. One particular device suitable for use is a rotary solenoid, some of which may be configured to rotate between two positions by a predetermined or configurable degree. When employed in use with a delivery vehicle, the delivery vehicle can provide an electrical signal to the rotary solenoid, thereby causing it to rotate a rotational shaft between a first and second position. When used in coordination with a UAV, the rotary solenoid may be in communication with the flight controller, providing control over the rotational shaft and fingers that are used to releasably couple an object for delivery, such as a canister, thereby allowing the UAV to retrieve and release the object.

Figure 5:
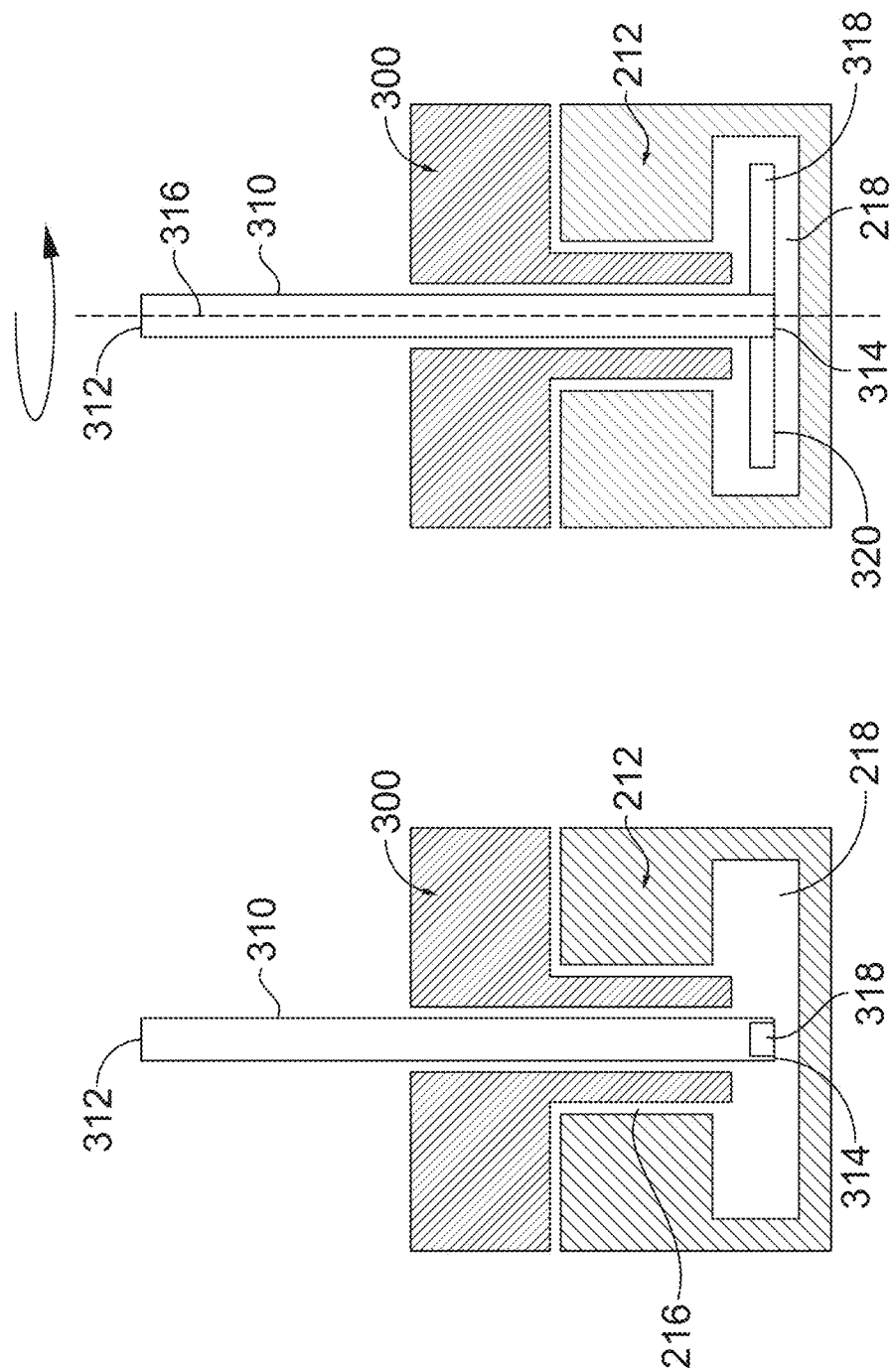
FIG. 5A is a cross sectional view of a portion of the rail bracket of FIG. 4 as inserted into the first securing channel of the canister of FIG. 2, where the first finger is in a first position, in accordance with an aspect described herein.
FIG. 5B is a cross sectional view of a portion of the rail bracket of FIG. 4 as inserted into the first securing channel of the canister of FIG. 2, where the first finger is in a second position, in accordance with an aspect described herein.

FIG. 5A and FIG. 5B are provided to illustrate an example of using rail bracket 300 to releasably couple canister 200 by way of first securing channel 212.

FIG. 5A is a cross sectional view of a portion of rail bracket 300 as at least partially inserted into first securing channel 212 of canister 200. Thus, rail bracket 300 is inserted into at least a portion of first securing channel 212. During insertion, first finger 318 is in a first position such that it is inserted through first width of first channel volume 216, thereby allowing first finger 318 to be disposed within second channel volume 218.

FIG. 5B is a cross sectional view of a portion of rail bracket 300 as inserted into first securing channel 212 of canister 200. As illustrated, first rotational shaft 310 is rotated about first rotational axis 316. In doing so, first finger 318 is rotated within second channel volume 218 and transitioned to a second position. In the example provided by FIG. 5B, first rotational shaft 310 has been rotated 90° and second finger 320 is now in view. Here, the relative positions of first finger 318 and second finger 320 are such that a relative length measured from along first finger 318 and second finger 320 is greater than the first width of first channel volume 216, thereby securing second shaft end 314 within second channel volume 218 and coupling canister 200 with rail bracket 300. By rotation of first rotational shaft 310 between the positions illustrated by FIGS. 5A and 5B, rail bracket 300 couples and decouples with canister 200. When used with a delivery vehicle, such as a UAV, the rail bracket provides a mechanism by which the delivery vehicle can retrieve and release the object being delivered.

It will be appreciated that other like components described herein may operate in a similar manner.

Figure 6:
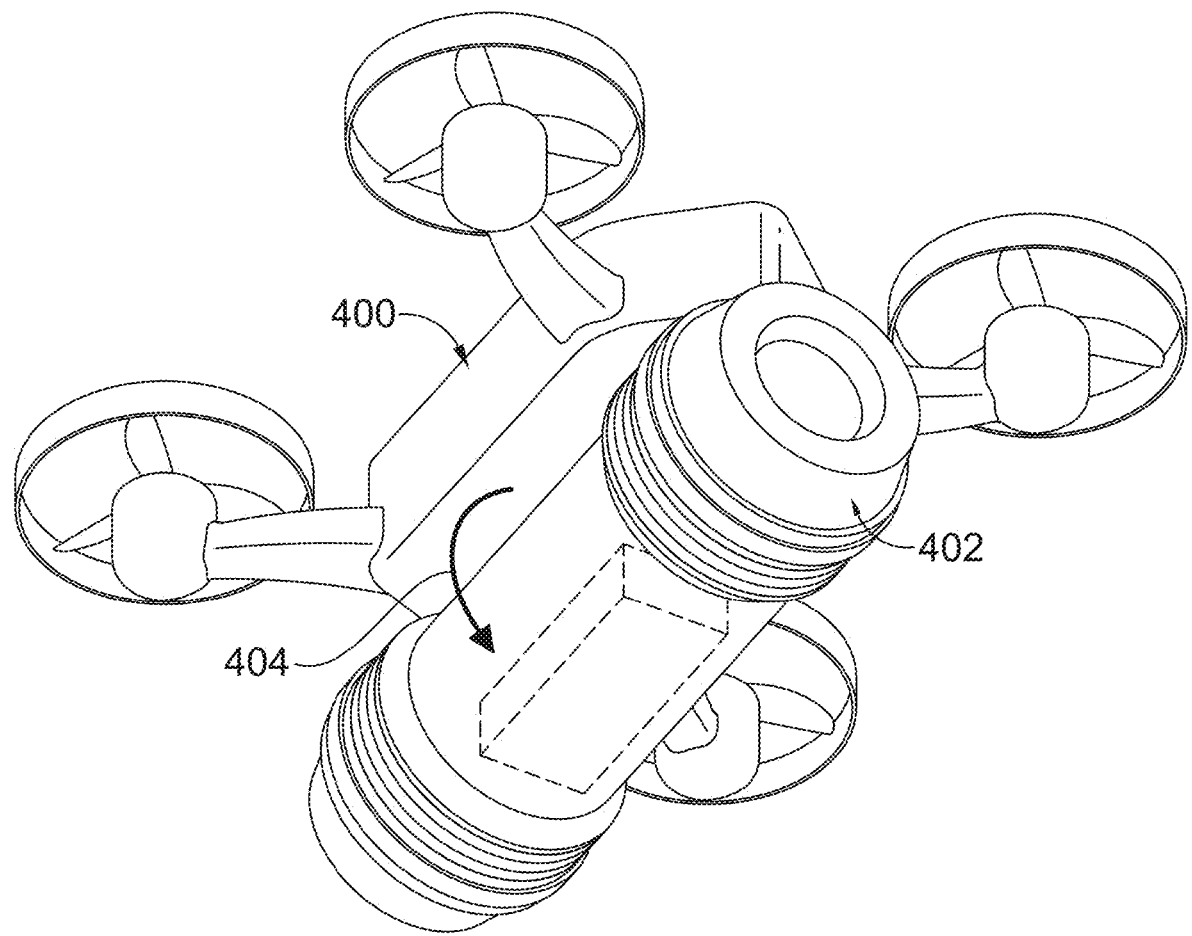
FIG. 6 is an example UAV comprising an example canister coupled thereto, in accordance with an aspect described herein.

Turning now to FIG. 6, an example UAV 400 is provided having example canister 402 coupled thereto. Coupling of canister 402 to UAV 400 is performed using a rail bracket (not visible in FIG. 6), such as rail bracket 300. Moreover, canister 200 is one example suitable for use as canister 402.

In this example, when coupled, canister 402 rotates about the rail bracket such that a center of gravity of the canister is aligned with a center of gravity of the UAV. This is due, at least in part, to a securing channel at least partially extending around canister 402. As such, components of the rail bracket slide through the securing channel as canister 402 rotates due to gravitational force. The rail bracket of UAV 400 is positioned along the center of gravity of UAV 400. As such, when canister 402 rotates after coupling, as indicated by rotational arrow 404, the center of gravity of canister 402 aligns with the center of gravity of UAV 400. By aligning the center of gravities, UAV 400 is more efficient during some flight patterns.

Figure 7:
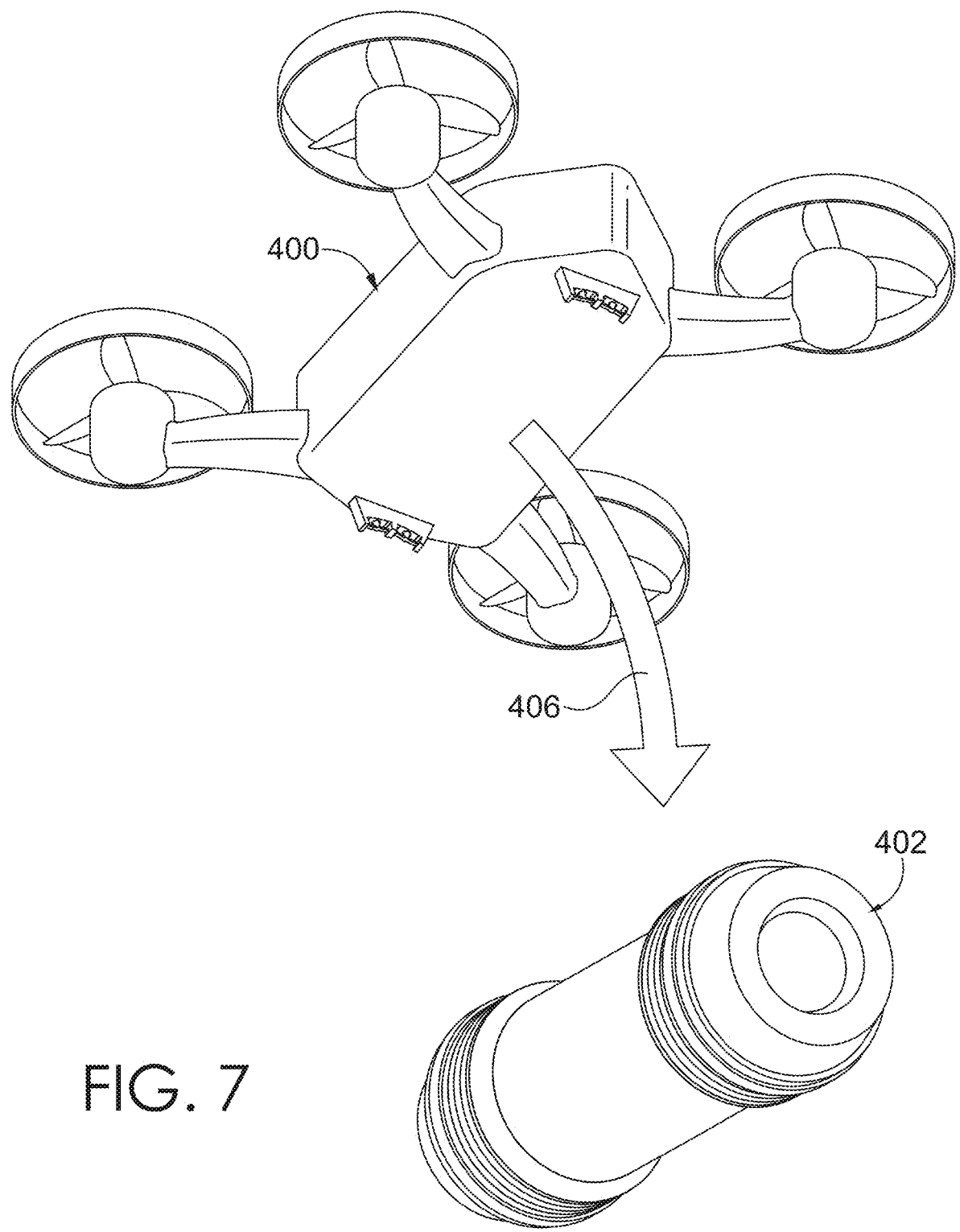
FIG. 7 is the UAV of FIG. 6 comprising the canister decoupled from the UAV, in accordance with an aspect described herein.

When UAV 400 has moved from a first location to a second location, canister 402 can be decoupled from UAV 400 by way of the rail bracket as previously described. As illustrated in FIG. 7, upon decoupling canister 402, canister 402 is released from UAV 400 at the second location, as indicated by arrow 406.

Figure 8:
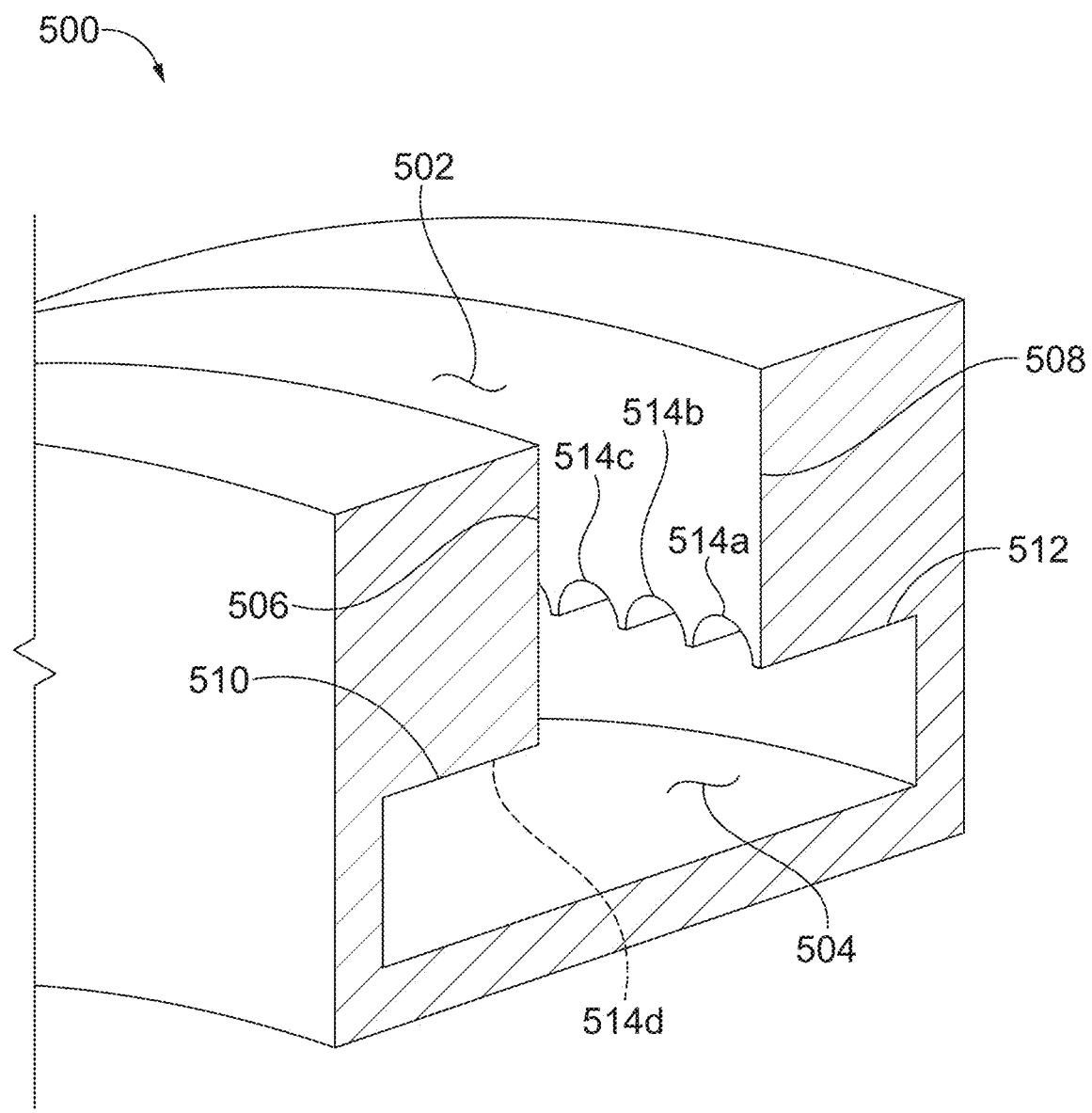
FIG. 8 is another example securing channel having a series of grooves that is suitable for use with any of the aspects described in FIGS. 1-7.

With reference now to FIG. 8, a side perspective, cross sectional view of another aspect of the technology is provided. Illustrated is securing channel 500. As similarly described, securing channel 500 comprises first channel volume 502 and second channel volume 504. First channel volume 502 is defined at least in part by first channel surface 506 and second channel surface 508, while second channel volume 504 is defined at least in part by third channel surface 510 and fourth channel surface 512.

In general, a securing channel may comprises one or more grooves on a channel surface of the securing channel. In the example aspect illustrated, securing channel 500 comprises one or more grooves disposed at third channel surface 510 and fourth channel surface 512. Of the one or more grooves, 514a-d are can be seen in the illustration. The one or more grooves can extend along third channel surface 510 and fourth channel surface 512 substantially perpendicular to first channel surface 506 and second channel surface 508.

In aspects, groove size may correspond to a finger width of a rail bracket, such as any of those described herein. The aspect provided by securing channel 500, may be used with any of the canisters described herein, and to facilitate coupling the canister via the rail bracket to a delivery vehicle. When used, securing channel 500 allows the canister to lock into a certain orientation. The finger of a rail bracket nests within a groove of the one or more groves and inhibits rotation of the canister. In cases where the rail bracket comprises a biased rotational shaft, the bias helps maintain the position of the finger within the groove. This aspects is beneficial when rotation of the canister is not desired or when a particular orientation of the canister is desired.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Terms, such as "having," "including," or the like, and derivatives thereof, are intended to have the same broad meaning as "comprising," unless otherwise expressly indicated.

Unless explicitly indicated otherwise, ranges are intended to provide example embodiments that are suitable for some aspects and implementations. They are not intended to exclude other embodiments of the technology having values falling outside of the given ranges.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all aspects described herein or illustrated the accompanying drawings is to be interpreted as illustrative and not in a limiting sense.

What is claimed is:

1. A canister comprising:
   a first canister end opposite a second canister end defining a longitudinal direction extending between the first canister end and the second canister end;

a wall extending between the first canister end and the second canister end and defining at least in part an interior volume of the canister; and a securing channel having a first channel volume and a second channel volume, the first channel volume having a first width in the longitudinal direction, and the second channel volume having a second width in the longitudinal direction and comprising a first channel surface and a second channel surface, wherein the first width is less than the second width, the second channel volume is more interior to a center aspect of the interior volume than the first channel volume, and the first channel surface and the second channel surface comprise a groove to allow a finger of a rail bracket to nest within the groove to couple the rail bracket to the securing channel.

2. The canister of claim 1, wherein the groove is configured to inhibit rotation of the canister when the finger is nested within the groove.

3. The canister of claim 1, wherein the first channel volume comprises a third channel surface and a fourth channel surface, and the groove extends along the first channel surface and the second channel surface substantially perpendicular to the third channel surface and the fourth channel surface.

4. The canister of claim 1, wherein a size of the groove corresponds to a width of the finger.

5. The canister of claim 1, further comprising a second securing channel having a third channel volume and a fourth channel volume, the third channel volume having a third width in the longitudinal direction, and the fourth channel volume having a fourth width in the longitudinal direction and comprising a third channel surface and a fourth channel surface, wherein the third width is less than the fourth width, the fourth channel volume is more interior to the center aspect of the interior volume than the third channel volume, the third channel surface and the fourth channel surface comprise a second groove to allow a finger of a second rail bracket to nest within the second groove to couple the second rail bracket to the second securing channel, and the securing channel is separated from the second securing channel by a distance in the longitudinal direction.

6. The canister of claim 5, wherein the securing channel extends parallel with at least a portion of the second securing channel.

7. The canister of claim 5, wherein a second distance from the securing channel to the first canister end is less than the distance separating the securing channel and the second securing channel.

8. A canister comprising:
a first canister end opposite a second canister end defining a longitudinal direction extending between the first canister end and the second canister end;
a wall extending between the first canister end and the second canister end and defining at least in part an interior volume of the canister; and
a securing channel having a first channel volume and a second channel volume, the first channel volume having a first width in the longitudinal direction, and the second channel volume having a second width in the longitudinal direction and comprising a first channel surface and a second channel surface, wherein the first channel surface and the second channel surface comprise a groove to allow a finger of a rail bracket to nest within the groove to couple the rail bracket to the securing channel.

9. The canister of claim 8, wherein the groove is configured to inhibit rotation of the canister when the finger is nested within the groove.

10. The canister of claim 8, wherein the first channel volume comprises a third channel surface and a fourth channel surface, and the groove extends along the first channel surface and the second channel surface substantially perpendicular to the third channel surface and the fourth channel surface.

11. The canister of claim 8, wherein a size of the groove corresponds to a width of the finger.

12. The canister of claim 8, further comprising a second securing channel having a third channel volume and a fourth channel volume, the third channel volume having a third width in the longitudinal direction, and the fourth channel volume having a fourth width in the longitudinal direction and comprising a third channel surface and a fourth channel surface, wherein the third channel surface and the fourth channel surface comprise a second groove to allow a finger of a second rail bracket to nest within the second groove to couple the second rail bracket to the second securing channel, and the securing channel is separated from the second securing channel by a distance in the longitudinal direction.

13. The canister of claim 12, wherein the securing channel extends parallel with at least a portion of the second securing channel.

14. The canister of claim 12, wherein a second distance from the securing channel to the first canister end is less than the distance separating the securing channel and the second securing channel.

15. A method comprising:
inserting a rail bracket within at least a portion of a securing channel of a canister, wherein:
the rail bracket comprises:
a first bracket surface exposed to a vehicle,
a rotational shaft having a first shaft end and a second shaft end with a longitudinal length extending between the first shaft end and the second shaft end, the rotational shaft extending through the first bracket surface and a first radial distance from a rotational axis extending along the longitudinal length, and
a finger extending radially from the rotational shaft proximate the second shaft end, the finger having a second radial distance from the rotational axis that is greater than the first radial distance, and
the securing channel has a first channel volume and a second channel volume, the first channel volume having a first width in a longitudinal direction of the canister, and the second channel volume having a second width in the longitudinal direction of the canister, and the second channel volume comprising a first channel surface and a second channel surface that comprise a groove; and
rotating the rotational shaft such that the finger transitions between a first position perpendicular to the longitudinal direction of the canister and a second position offset from the first position to allow the finger to nest within the groove.

16. The method of claim 15, wherein when the finger is in the first position, the canister is decoupled from the vehicle, and when the finger is in the second position, the canister is coupled to the vehicle.

17. The method of claim 15, wherein when the finger is in the second position, the canister is inhibited form rotating.

18. The method of claim 15, wherein the second position is offset from the first position by about ninety degrees.

19. The method of claim 15, wherein the vehicle is an unmanned aerial vehicle (UAV).

20. The method of claim 15, wherein the vehicle provides an electrical signal to a rotary solenoid, thereby rotating the rotational shaft such that the finger transitions between the first position and the second position.

\* \* \* \* \*